US007873703B2

(12) United States Patent
Bauchot et al.

(10) Patent No.: US 7,873,703 B2
(45) Date of Patent: Jan. 18, 2011

(54) METHOD AND APPARATUS FOR BROADCASTING INFORMATION

(75) Inventors: Frederic Bauchot, Saint-Jeannet (FR); Jean-Luc Collet, La Gaude (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/762,303

(22) Filed: Jun. 13, 2007

(65) Prior Publication Data

US 2008/0005772 A1  Jan. 3, 2008

(30) Foreign Application Priority Data

Jun. 30, 2006 (EP) .................................. 06116438

(51) Int. Cl.
*G06F 15/16* (2006.01)
*H04N 7/16* (2006.01)
*H04N 7/173* (2006.01)

(52) U.S. Cl. .................... 709/218; 725/62; 725/103; 725/109; 725/135; 725/141

(58) Field of Classification Search ................ None
See application file for complete search history.

(56) References Cited

U.S. PATENT DOCUMENTS

| 6,018,764 | A | 1/2000 | Field et al. |
| 6,330,395 | B1 | 12/2001 | Wu |
| 6,377,981 | B1 | 4/2002 | Ollikainen et al. |
| 6,459,427 | B1 * | 10/2002 | Mao et al. .................... 725/109 |
| 6,775,231 | B1 * | 8/2004 | Baker et al. .............. 370/230.1 |
| 7,406,098 | B2 * | 7/2008 | Taneja et al. ................. 370/468 |
| 7,596,789 | B2 * | 9/2009 | Olesinski et al. ............ 718/102 |
| 2002/0069296 | A1 * | 6/2002 | Aua et al. .................... 709/246 |
| 2003/0174652 | A1 * | 9/2003 | Ebata ......................... 370/235 |
| 2004/0060068 | A1 * | 3/2004 | Barbier et al. .............. 725/109 |
| 2004/0153564 | A1 * | 8/2004 | Lakkakorpi ................. 709/232 |
| 2004/0236865 | A1 | 11/2004 | Ullman et al. |
| 2005/0038904 | A1 | 2/2005 | Dougall |
| 2008/0005163 | A1 | 1/2008 | Bauchot et al. |

FOREIGN PATENT DOCUMENTS

JP  2004260573 A  9/2004

\* cited by examiner

*Primary Examiner*—John B. Walsh
(74) *Attorney, Agent, or Firm*—Marjama Muldoon Blasiak & Sullivan LLP (57) ABSTRACT

A method of transmitting a web object over a broadcast standard channel to a remote mobile device, the method comprising the steps of accessing one or more web objects from a web server, wherein each web object has an address, determining a hierarchy and an address linkage pattern for the one or more web objects, identifying a closed web site from the one or more web objects, translating the address of one of the web objects in the closed web site to an indicator which is based on the hierarchy and address linkage pattern of the web objects; storing the closed web site such that the web object is stored with its associated indicator, and transmitting a required web object from the stored closed web site at a frequency and a repetition rate which is determined from the indicator.

10 Claims, 8 Drawing Sheets

URL Mapping Table

| Object name | Object type | OID | USAGE | Root hops | Ref cnt | Size Kb |
|---|---|---|---|---|---|---|
| Index.htm | text | 100 | Broadcast | 0 | 0 | 1 |
| Page1.htm | text | 101 | Broadcast | 1 | 1 | 1.5 |
| Page2.htm | text | 102 | Broadcast | 1 | 2 | .8 |
| Page3.htm | text | 103 | Broadcast | 1 | 2 | 1 |
| Page11.htm | text | 104 | Broadcast | 2 | 1 | 2 |
| Page12.htm | text | 105 | Broadcast | 2 | 2 | 1.3 |
| Page21.htm | text | 106 | Broadcast | 2 | 1 | |
| Page22.htm | text | 107 | Broadcast | 2 | 1 | |
| Page31.htm | text | 108 | Broadcast | 2 | 1 | |
| Page32.htm | text | 109 | Broadcast | 2 | 1 | |
| Bkgrnd.gif | image | 110 | Broadcast | 1 | 11 | |
| Video1.mpg | video | 111 | On Demand | 2 | 4 | 850 |
| Audio1.mp3 | audio | 112 | On Demand | 2 | 3 | 500 |

METHOD AND APPARATUS FOR BROADCASTING INFORMATION

CROSS REFERENCE TO RELATED APPLICATIONS

This application is related to U.S. patent application Ser. No. 11/762,402 entitled "METHOD AND APPARATUS FOR CACHING BROADCASTING INFORMATION", filed on Jun. 13, 2007, and hereby incorporated by reference.

FIELD OF THE INVENTION

The present invention relates to a method and apparatus for broadcasting information particularly but not exclusively to information presented in the form of web information to be sent to a mobile device.

BACKGROUND OF THE INVENTION

In the environment of mobile television (e.g. hand held television) there are several broadcasting techniques. Mobile TV technology offers consumers the chance to enjoy high quality terrestrial digital broadcasts along with voice telephony and Internet access all in a single wireless device. The digital video broadcast for hand-held (DVB-H) broadcasts Internet Protocol (IP) data-casts is an end-to-end broadcast system for the delivery of any type of digital content and services using IP based mechanisms that are optimised for devices with limitations on computational and battery resources.

An inherent part of IP data-cast (IPDC) is that it comprises a unidirectional DVD broadcast path that may be combined with a bidirectional mobile cellular interactive part. IPDC is a valuable platform for enabling the convergence of services from broadcast media and telecommunications demand.

The file delivery method used in the IPDC is based on the File Delivery Over Unidirectional Transport (FLUTE) protocol. FLUTE delivers contents in files, which may include any type of data (e.g. audio, video, binary, still images, texts, ESG meta-data etc.).

It is possible to access a web server using mobile equipment, for example using WIFI. However, WIFI coverage tends to be very limited and is generally only used in private areas or airports and the like. Although it is possible to connect to a web server using 2.5G or 3G communication means such as GPRS, EDGE or UMTS, it is also necessary to have a subscription which can be expensive and tends to be used by professionals and is not always attractive to the public. New standards are emerging to broadcast TV on mobile equipment (e.g. DVB-H). Some of these standards define means for object transmission.

Figure 1:
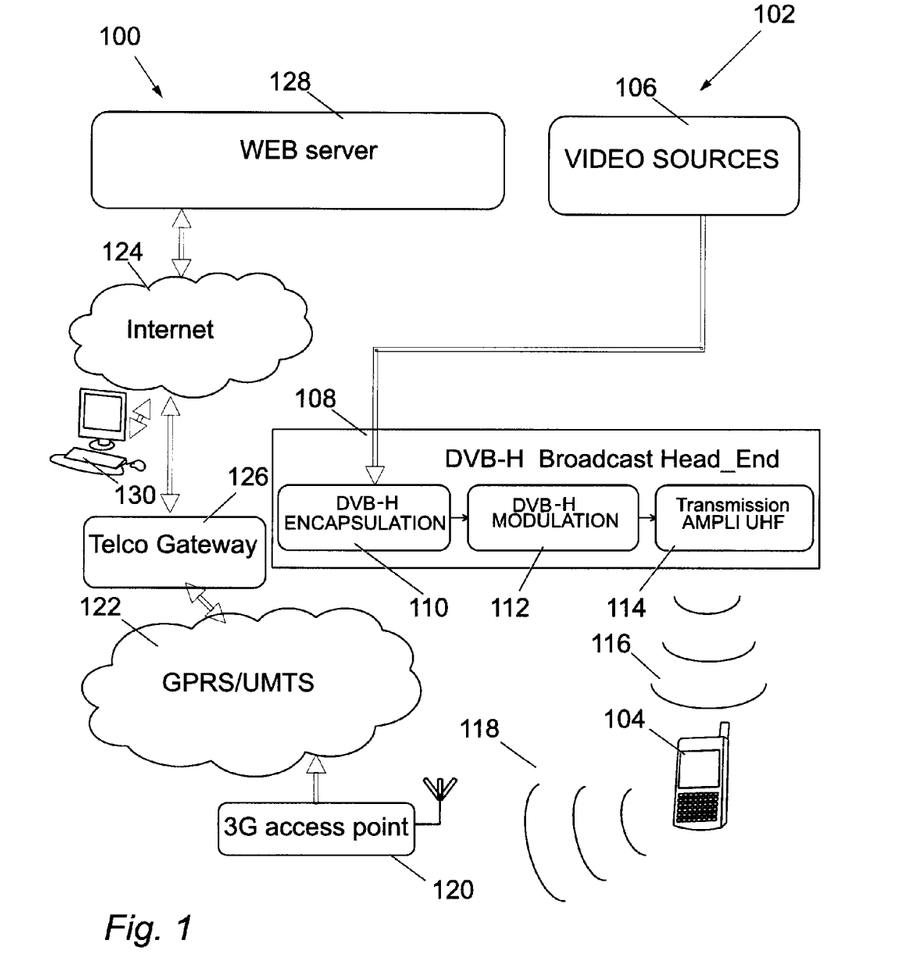
FIG. 1 is a block diagram of a known mobile internet infrastructure system and a separated Digital Video Broadcast infrastructure.

FIG. 1 depicts a known mobile internet infrastructure 100 and a separated Digital Video Broadcast infrastructure 102. A mobile user may access both TV channels and an internet site using a mobile device 104. TV channels may be broadcast using, for example, DVB-H in Europe. A video source 106 may broadcast using a DVB-H Broadcast Head-End 108 which may include a DVB-H Encapsulation module 110, a DVB-H Streamer or Modulator 112 and an Amplifier 114. A VHF/UHF signal 116 can be emitted by the DVB-H Head-End 108 and received by the mobile device 104. Mobile device 104 may be a GSM phone or a PDA enabled to process DVB-H. In a parallel mode, mobile device 104 may support conventional Web browser capabilities and can receive signals 118 from an access point 120 belonging to a GPRS/UMTS network 122 for example. The GPRS/UMTS network may access the internet 124 by means of a Telco gateway 126. The internet may access a Web server 128 to obtain content for transmission to the user. Web server 128 may also be accessed by means of a non-mobile device, for example a computer 130, which may be connected via a wired line such as PSTN, ADSL, etc.

There are some problems that are encountered with the known systems and methods. Firstly there is a requirement for expensive subscriptions and wireless equipment able to support a communication stack capable of reaching the internet and a separate communication stack capable of receiving broadcast television. A further problem exists in that coverage for internet and TV broadcast are not necessarily equivalent in certain areas, some areas may have coverage of one, some may have coverage of another, and some may have coverage of both or neither.

One object of the present invention is to overcome at least some of the problems associated with known methods and systems using new broadcast transmission mean (Eg: DVB-H) to transmit web objects included in a closed web site and to allow a user to navigate this web site in a broadcast environment without requiring return channel means as well as video services and associated data such as an Electronic Service Guide (ESG).

Another object of the invention is to calculate an object weight to order the frequency and delay with which a web object can be transmitted over the broadcast means.

SUMMARY OF THE INVENTION

The present invention is directed to the method and system as defined in the independent claims.

According to one aspect of the invention there is provided a method of transmitting at least one web object over a broadcast standard channel to a remote mobile device, the method comprising the steps of accessing the at least one web object from a web server, wherein the at least one web object has an address, determining a hierarchy and an address linkage pattern for the at least one web object, identifying a closed web site from the at least one web object, translating the address of the at least one web object in the closed web site to an indicator which is based on the hierarchy and address linkage pattern of the at least one web object, storing the closed web site such that the at least one web object is stored with its associated indicator, and transmitting the at least one web object from the stored closed web site at a frequency and a repetition rate which is determined from the indicator.

According to another aspect of the invention there is provided an apparatus for transmitting at least one web object over a broadcast standard channel to a remote mobile device, the apparatus comprising a web server including at least one web object, wherein the at least one web object has an address, a hierarchy and an address linkage pattern for the at least one web object, a closed web site from the at least one web object, and an indicator which is based on the hierarchy and address linkage pattern of the at least one web object for translating the address of the at least one web object in the closed web site.

According to yet another aspect of the invention there is provided a system of transmitting at least one web object over a broadcast standard channel to a remote mobile device, the system comprising means for accessing the at least one web object from a web server, wherein the at least one web object has an address, means for determining a hierarchy and an address linkage pattern for the at least one web object, means for identifying a closed web site from the at least one web object, means for translating the address of the at least one web object in the closed web site to an indicator which is based on the hierarchy and address linkage pattern of the at least one web object, means for storing the closed web site such that the at least one web object is stored with its associated indicator, and means for transmitting the at least one web object from the stored closed web site at a frequency and a repetition rate which is determined from the indicator.

According to still yet another aspect of the invention there is provided a Web Broadcast gateway device comprising a Web site pump for exploring a closed web site to identify each web object in the site, a web page translator, and a Carousel scheduler.

Further embodiments of the invention are provided in the appended dependent claims.

The advantages of the present invention are that all media (both web objects and video for example) are broadcast using only the broadcast side of access to the mobile device. Whilst network subscription e.g. UMTS/3G can be maintained if required they are not necessary using the present invention to navigate in a closed web site and to access web objects therein. In addition, the fact that there are reduced costs in terms of subscription is likely to result in increased adoption of mobile devices adapted to operate in accordance with the present invention.

BRIEF DESCRIPTION OF THE DRAWINGS

Reference will now be made by way of example, to the accompanying drawings, in which.

DETAILED DESCRIPTION OF THE PREFERRED EMBODIMENT

Figure 2:
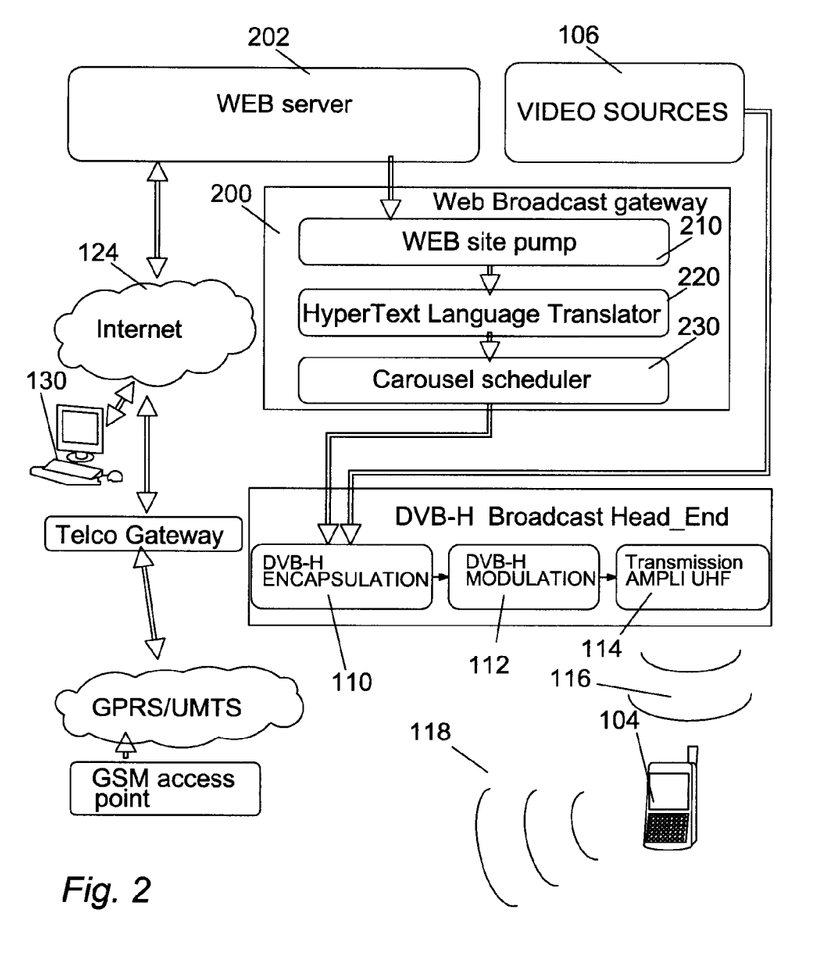
FIG. 2 is a block diagram of a Web Cast and Digital Video Broadcast infrastructure according to the present invention.

The FIG. 2 shows a web cast and digital video broadcast infrastructure/system, which includes a Web Broadcast gateway 200 in accordance with the present invention. Web Broadcast gateway 200 is a link between a WEB server 202 and the digital video broadcast environment. Web Broadcast gateway 200 allows a mobile user having only broadcast TV capabilities, to access a web site and to access web objects such as music, Video, images, etc. The term web objects used herein is intended to include all types of information found on the web. Web Broadcast gateway 200 is used to broadcast objects forming a so-called closed web site or closed web object set. The term closed web site defines a web site in which links found on a web page of the site, refer to an object of this web site. In other words, no reference to an "external site" may be found in a web page of a closed web site. This will be described in greater detail below. The closed web site is generated in any appropriate manner by the service provider (ISP). Once the closed site is formed it is broadcast from the transmitter as will be described hereinbelow.

In a preferred embodiment of this invention Web Broadcast gateway 200 includes three main elements. The first element is a WEB site pump 210, which periodically explores the closed web site to identify each object belonging to the site. For each object found, a unique reference, unique object identifier (OID) is determined and a record is added or updated in a table which contains all the objects constituting the closed web site. The table is formed during an interrogation phase in which the extent and content of the closed web site is determined. The table may be marked as complete once the interrogation phase is finished.

The second element of Web Broadcast gateway 200 is a HyperText Language Translator 220 which replaces the URL found in the web page (HTML, WML, etc.) to a new URL which comprises the OID and optionally meta-data relating to the web page or object. This will be described in greater detail below.

The third element of Web Broadcast gateway 200 is a Carousel scheduler 230. Scheduler 230 may utilize the table built by WEB site pump 210. Scheduler 230 includes a weighting associated with each object. The weighting is based on the number of references to this object in the other closed web site pages or objects, the number of "hops" to reach this object from the root page and the size of the object. Using the weighting, the Carousel is populated.

The web objects which are identified, stored, and broadcast are then delivered at the user end using the FLUTE protocol as will be described in greater detail below.

The weighting depends on a number of parameters or criteria and will determine the frequency and regularity with which objects are broadcast. For example, the root object will be stored in most slots of the carousel and be broadcast at those slots. Objects further down the web tree may be stored less often and broadcast less often. The objects at the bottom of the tree will be the least frequent. The frequency and weighting of the objects will also depend on the relative sizes of the objects and Carousel and also the frequency of transmission for slot to slot.

Web objects are downloaded from WEB Server 202 prior to being processed and stored by Web Broadcast gateway 200. The mobile internet structure described in FIG. 1 is still maintained, i.e. Telco Gateway 126, GPRS/UMTS 122 and the GSM access point. However the structure as shown in FIG. 1 is not used to download web objects. Instead the output from Web Broadcast gateway 200 (from Carousel scheduler 230) is combined with the video source output in DVB-H encapsulation module 110 as will be described in more detail below.

Mobile device 104 thus only receives transmissions from the DVB-H Broadcast Head_End. The connections may be still available for other technologies for example GPRS or UMTS via link 118. However for the purposes of this invention these types of connections will not be described further.

Figure 3:
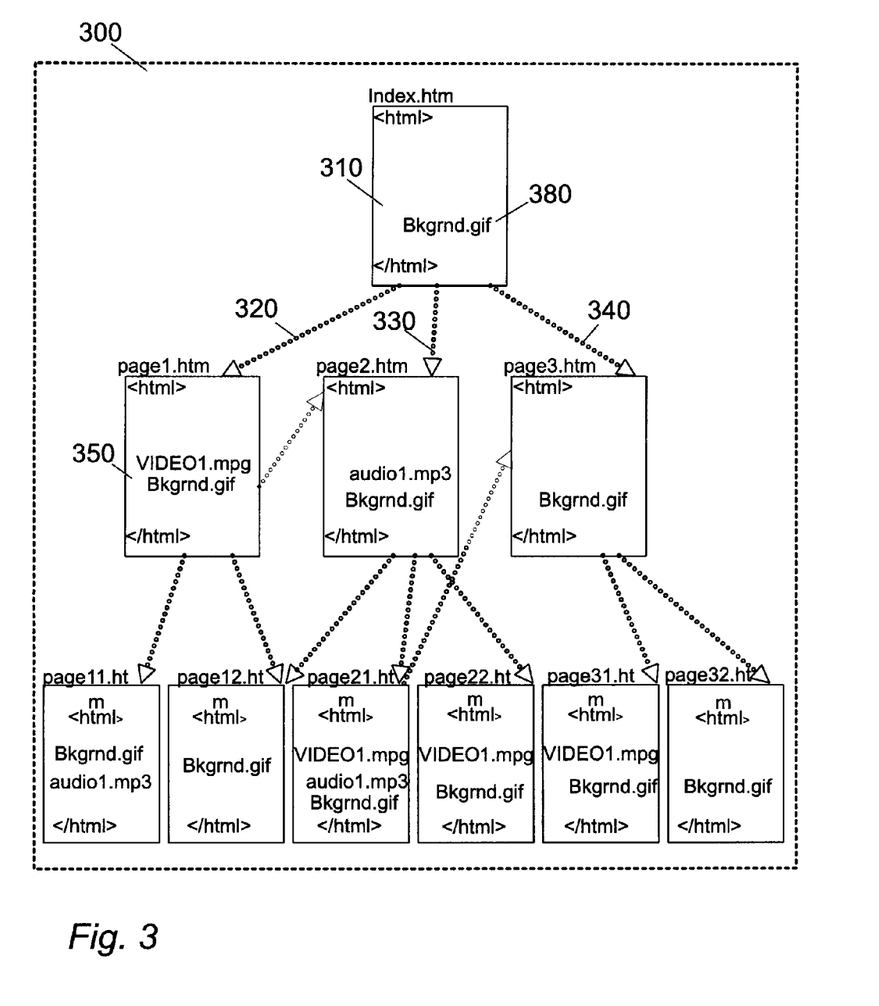
FIG. 3 is a block diagram showing the relationship between different Web objects according to the present invention.

The closed web site will now be described in more detail with reference to FIG. 3. FIG. 3 shows web objects with their relationships within a closed web site 300. Closed web site 300 is a site where there is no reference to an external web site having references to other sites. In other words, the number of hops starting from the root page to reach the farthest web object in the site is limited to a predefined value. This can vary depending on the storage capacity, the nature of the tree (i.e. how many pages at each hop) and the individual page sizes etc. If there are external references (i.e. outside the closed web site) these can be ignored and/or generate an appropriate message for the user to indicate that the external reference is not available. In closed web site 300 a root page 310 (Index.htm) has four links. Three links are on other web pages, link 320 on a first page page1.htm 350, link 330 on a second page page2.htm and link 340 on a third page page3.htm. The fourth link refers to an image Bkgrnd.gif 380. In turn each of the pages on the second level (page one, page two and page three) have links to pages at a third level which are two hops from root page 310. Page2.htm is referenced two times in root page 310 and in page1.htm 350 and can be reached from different routes.

The third level of pages (pages 11, 12, 21, 22, 31, 32) is the final level in this example. In other situations the tree could include more or less than three levels of pages. A file (or object) VIDEO1.mpg can be accessed in a number of different locations (e.g. page 1, page 21, page 22 and page 31). Similarly audio1.mp3 can be accessed on pages 2, 11 and 21. Flexibility to the user in accessing web objects or files and in minimizing delays in the user viewing specific pages is enhanced. With knowledge of the web object tree and the various jumps, hops or steps between respective pages a table can be created which will be described with reference to FIG. 4. This enables the system of the present invention to operate hypertext language translations and to optimize storage.

Figure 4:
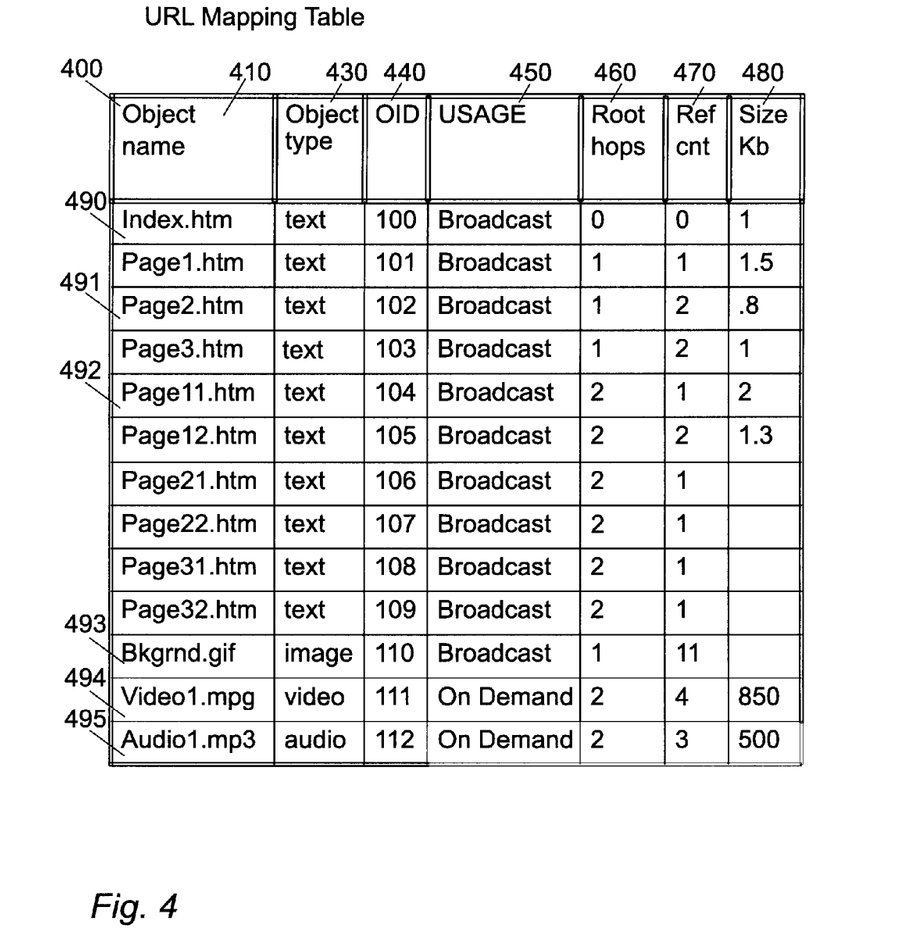
FIG. 4 is a URL Mapping Table which shows the URL mapping of the web objects according to the present invention.

FIG. 4 shows a URL Mapping Table 400 according to the present invention in which each entry represents an object of closed web site 300 shown in FIG. 3. The table includes a number of columns in which the headings are identified and described below.

A page name 410 is shown in column 1 and is the name of the object as defined in the WEB server 202. The name may be prefixed by a hierarchy of directories which are under the Web home directory, or in any other appropriate manner.

A page type 430 is shown in column 2 and indicates the Web object type. Examples include "text" for html, wml pages; "image" for Jpeg, gif, tiff or any other image or photo files; "audio" for mp3, wma, avi or any other audio or music file formats; "video" for mpeg, avi, QuickTime movie or any other video file formats.

An OID 440 is shown in the next column. The OID 440 is a unique reference number which identifies the web object in closed web site 300. OID 440 will substitute the page name in the links found in all the pages forming closed web site 300 as will be described in greater detail below.

A field indicating USAGE 450 is also identified and populated. Although all objects are broadcast, some objects may not be usable as they are received with control access protection. To make these objects usable, the user (consumer) may request a license. Usage "on demand" is associated with these protected objects, while usage "broadcast" is used for all other objects.

A Root hop count 460 indicates the number of pages separating the object from the root page. This information will be used to compute the object weight for the carousel scheduling.

A reference count (Ref cnt) 470 is the number of references pointing to an object in all the pages in closed web site 300. This information is also used in the computation of the object weight for the carousel scheduling.

A size indicator (Size) 480 of each object provides the size in Kbytes (Kb) and is also used in the computation of the object weight for the carousel scheduling as will be described below.

The above-described table is used in a translator and also in the scheduler (or carousel) as will be described below.

Figure 5:
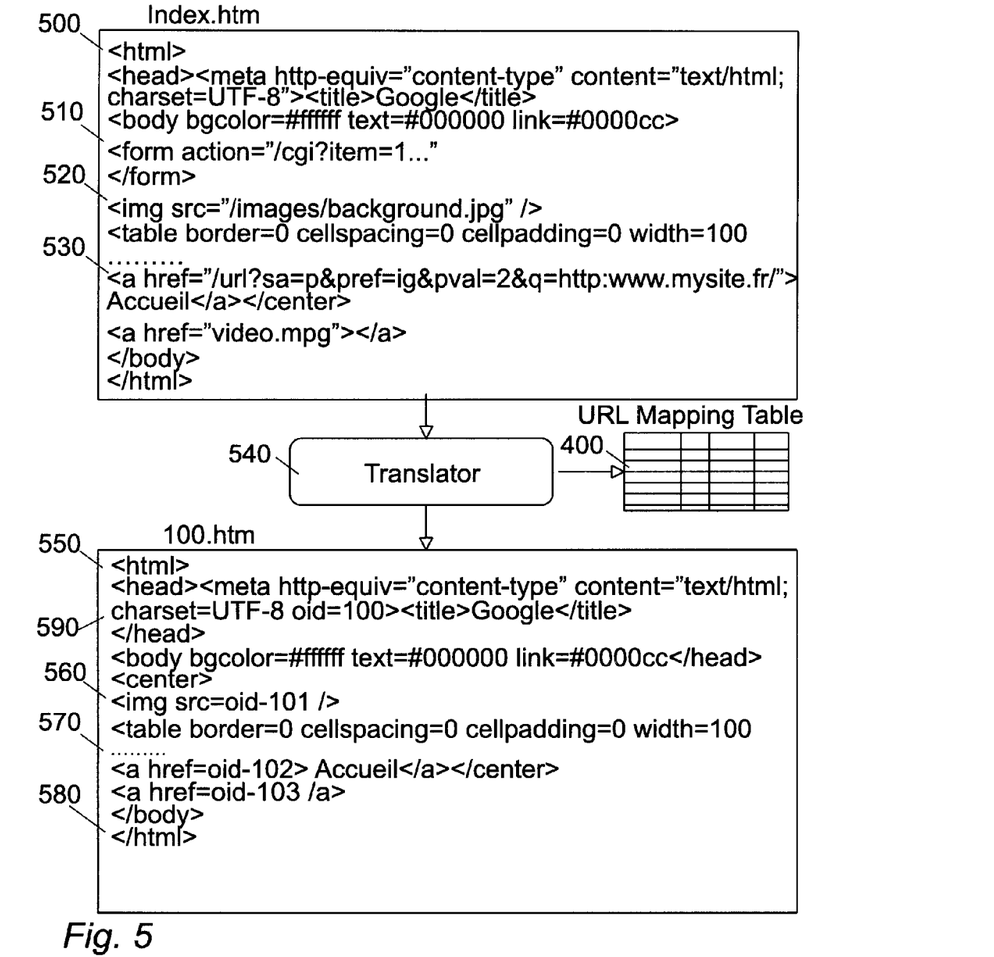
FIG. 5 shows an HTML page translation according to the present invention.

More detail of the translator is now described with reference to FIG. 5, which shows an example of an HTML page translation. An input page 500 (Index.htm) which is downloaded from the WEB server 202 is to be translated. The translation is carried out by an application 540 which parses the input and replaces all URL addresses in the link by a OID extracted from URL Mapping Table 400 which has been built by a web pump. The resulting translation gives a page 550 (100.htm) where input references 510, 520 and 530 are respectively replaced by OID references, 560, 570 and 580. Moreover, the OID of the page itself is added in a header statement 590. In the client web browser, the OID numbers in the translated pages are used to request from a client web proxy requested object among all broadcasted objects and to transmit these as soon as they have been received. In this way closed web site 300 may be updated.

Figure 6:
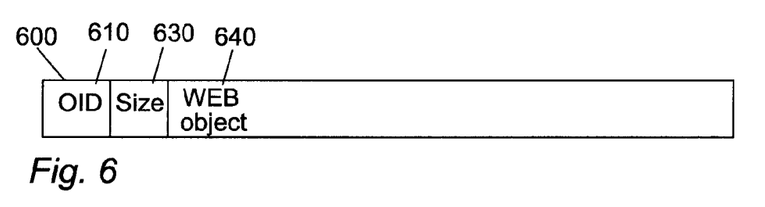
FIG. 6 is a diagram showing the object transport format of a data system according to the present invention.

FIG. 6 depicts the format of a data system 600 used to transport the web object. OID 610 represents a unique object identification, while Size 630 indicates object size and Web object 640 is the web object itself. OID 610 and Size 630 are headers in this example and enable the contents of Web object 640 to be delivered to the user. The delivery of the converted files is effected as previously described with reference to FIG. 2 by Carousel scheduler 230.

Figure 7:
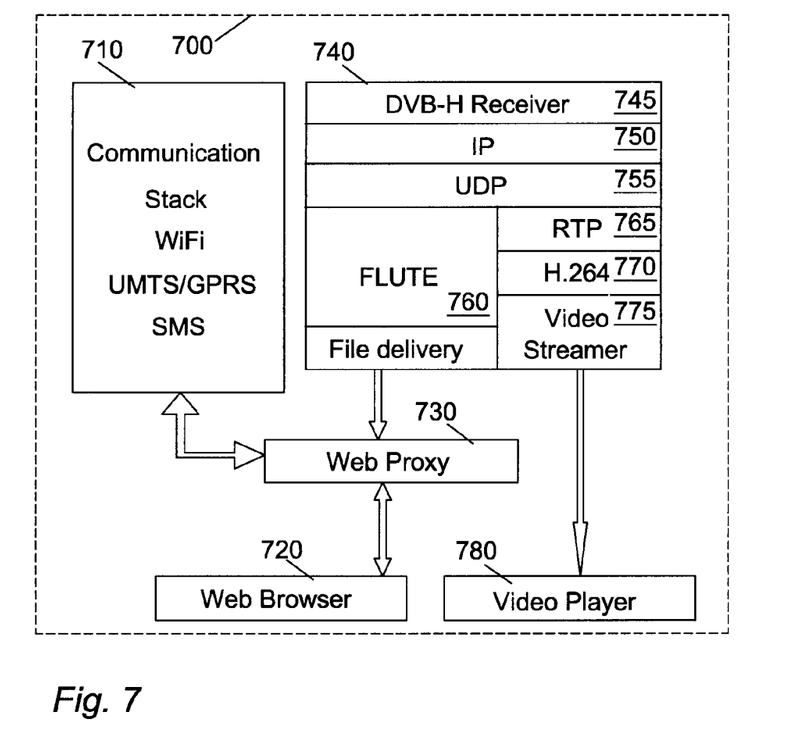
FIG. 7 is a block diagram showing the structure of an embodiment of a Web client according to the present invention.

The receipt of the transmission is handled at the web client of the mobile device in accordance with the following. FIG. 7 shows the structure of a Web client 700. Web client 700 includes a Web Browser 720 communicating with Web server 202 through a Communication Stack 710 which may use one of the widely used protocol such as WIFI, 2.5 and 3G protocols (GPRS, EDGE, UMTS). Terminals supporting TV broadcast have new functions in accordance with the present invention, for example a Video Player 780 and a DVB-H Receiver 740.

DVBH Receiver 740 includes a number of different functions and layers, for example: a DVB-H Receiver 745; an IP module 750; a user datagram protocol (UDP) module 755 and two session layers 760 and 765 are provided for the data part FLUTE and for the video Real Time Protocol (RTP) respectively.

The video processing elements also include a H.264 decoder 770 and a Video Streamer (IP Multicast) 775. The output from Video Streamer 775 is sent to Video Player 780 for display to the user.

The present invention implements a new component which may be launched as a service which intercepts all requests from the browser and acts as a Web Proxy 730. This new component examines all files received on FLUTE 760 and delivers to the browser the requested file as soon as it has been received. This component does not need any modification by the client applications, just a configuration of the web browser to define local usage of the Web Proxy 730. Web Proxy 730 caches the page and then passes it to the web browser.

Web Proxy 730 connection to Communication Stack 710 can facilitate conventional connection to internet content if required. This facility is optional and may be switched on and off as required.

With Web (and video) client 700 as described above the user may receive a broadcast stream of data including web objects and video without having to have two separate infrastructures for each. Any type of data can be broadcast to a user. The amount and speed of delivery being limited only as a function of the broadcast transmission capabilities and not as a function of the user's subscription, which might have limited availability and connectivity.

The method steps carried out at both the transmission end of the system and the receiver end of the system will now be described with reference to FIGS. 8 and 9 respectively.

Figure 8:
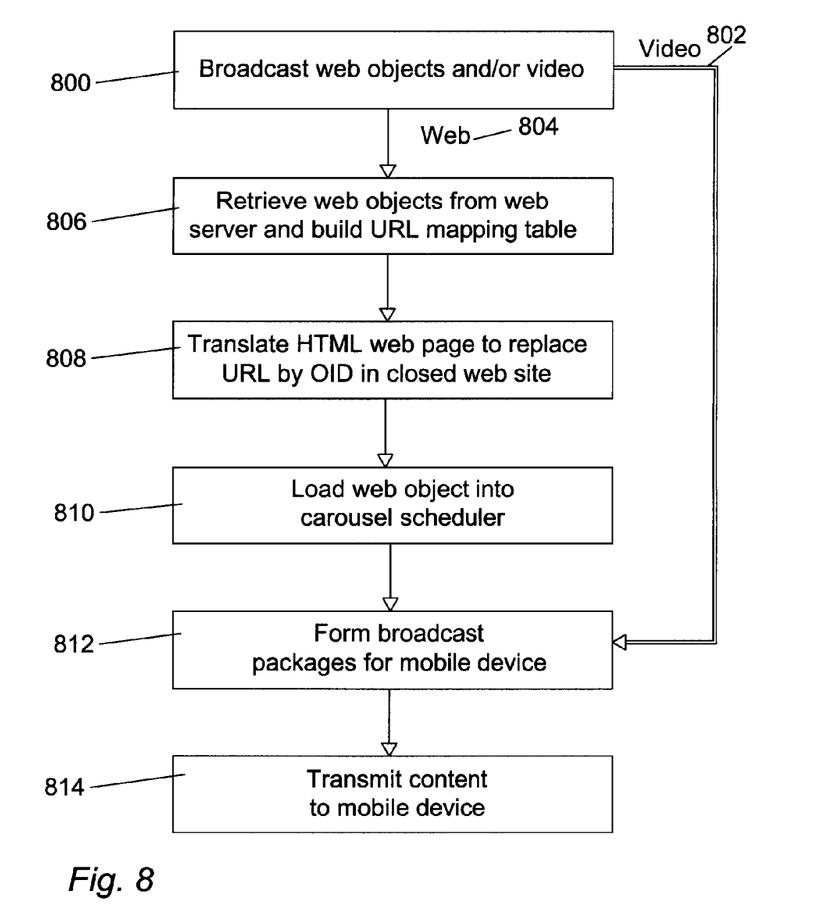
FIG. 8 is a flow chart showing the method steps carried out at the transmission end of the data system in accordance with the present invention.

Firstly at a transmission end of the system as shown in FIG. 8, a broadcaster decides to transmit either web objects from a closed web site, a video source or a combination to mobile devices and commences the process at step 800. The manner in which the content is broadcast will depend on the nature of the mobile device and the broadcast reception available to the user. Prior to transmission, the video stream and web objects are processed differently. When a video stream is broadcast at step 802, a video stream for the mobile device is formed at step 812 and transmitted at step 814.

For broadcasting web objects at step 804, one or more web objects from closed web site 300 are downloaded from the web server. The web objects are formed into closed web site 300 as previously described at step 806. The extent of closed web site 300 being determined by the size of the web pages, tree structure (i.e. hops from root pages) and the amount of links to the pages from other pages in closed web site 300, as well as the capacity of the storage means at the transmitter and/or receiver ends of the system.

The web objects in closed web site 300 are then translated so that the links between pages can be changed from HTML links to OID references (as described above) at step 808. The translated objects are then loaded into the Carousel scheduler 230 at step 810 in a predetermined manner based on their weightings.

The web objects are then formed into a package for broadcast at step 812 to the user. The package (and its contents) is broadcast to the mobile device of the user at step 814.

Figure 9:
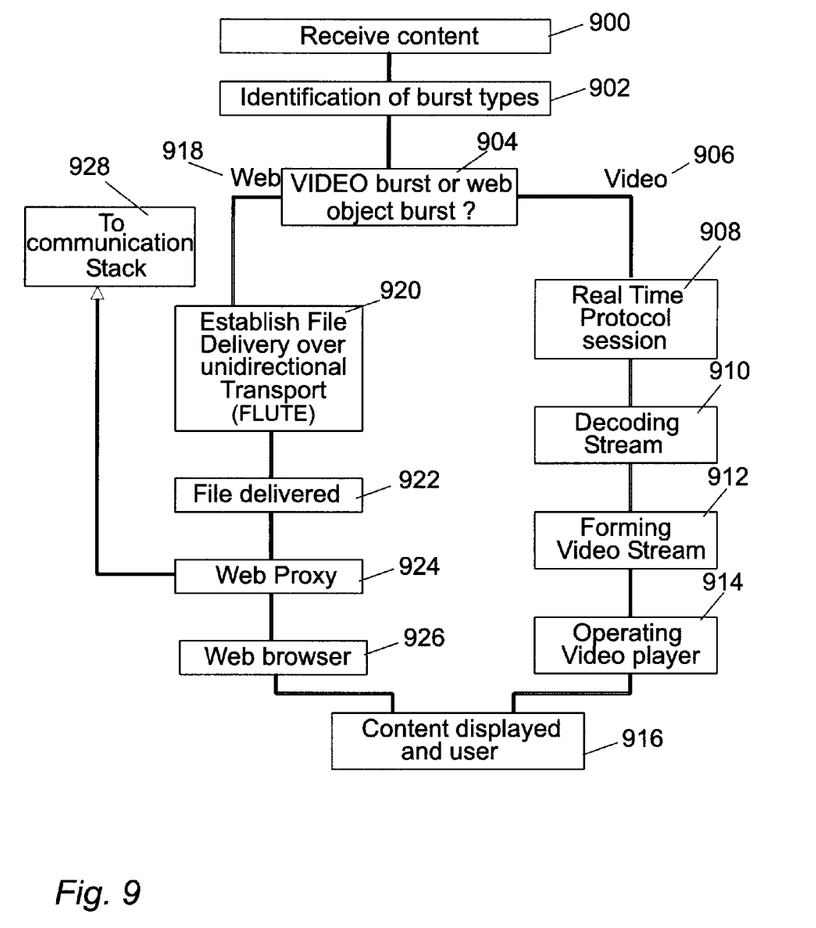
FIG. 9 is a flow chart showing the method steps carried out at the reception end of the data system in accordance with the present invention.

With reference to FIG. 9, the content from the transmission end of the system is received at the mobile device in bursts at regular time slots at step 900. The different burst types are broadcast and received at different time slots. The time at which the bursts arrive is scheduled and known at step 902 and the type of burst is determined at step 904.

If the bursts are video 906, the bursts are processed using for example, an RTP session at step 908, a Decoding Stream step 910, for example H.264 decoding, and the content is steamed by a Video Streaming Process at step 912. The video is then passed through a Video player at step 914 and displayed to the user at step 916.

If on the other hand, the bursts contain a Web object step 918 the contents are read and a FLUTE session is established at step 920, which in turn facilitates file delivery at step 922 via the Web Proxy at step 924. The Web Proxy passes the web object through the Web browser at step 926 and the content is displayed to the user at step 916.

The Web Proxy may also connect to the communications stack 710 at step 928 to enable further requests from the user to be communicated to the transmission end as is well known in the art.

The mobile device may be of any type, including for example, pdas, mobile phones or any other type of which is mobile and can communicate remotely.

The standards such as DVB-H, RTP, H.264 etc described herein are shown by way of example only and any other standards present or future may be equally applicable.

There are many advantages of the present invention. A significant advantage being that all media (both web objects and video for example) are broadcast using only the broadcast side of access to the mobile device. Whilst network subscription eg. UMTS/GPRS can be maintained if required they are not necessary using the present invention for access to web objects. The fact that there are reduced costs in terms of subscription is likely to result in increased adoption of mobile devices adapted to operate in accordance with the present invention.

The broadcaster may have influences on the closed web site to enable them to match the broadcast media, for example, tickets for the next match if a user is watching a certain game, appropriate advertising, etc.

While the invention has been particularly shown and described with reference to a preferred embodiment, it will be understood that various changes in form and detail may be made therein without departing from the spirit, and scope of the invention.

What is claimed is:

1. A method of transmitting at least one web object over a broadcast standard channel to a remote mobile device, the method comprising the steps of:
    utilizing a Web Broadcast gateway device to access the at least one web object from a web server, wherein the at least one web object has an address;
    utilizing a Web Broadcast gateway device to determine a hierarchy and an address linkage pattern for the at least one web object;
    utilizing the Web Broadcast gateway device to identify a closed web site from the at least one web object;
    utilizing the Web Broadcast gateway device to translate the address of the at least one web object in the closed web site to an indicator which is based on the hierarchy and address linkage pattern of the at least one web object;
    utilizing the Web Broadcast gateway device to store the closed web site such that the at least one web object is stored with its associated indicator; and
    utilizing the Web Broadcast gateway device to transmit the at least one web object from the stored closed web site at a frequency and a repetition rate which is determined from the indicator.

2. The method of claim 1, further comprising utilizing the Web Broadcast gateway device to store the hierarchy and the address link pattern with the stored at least one web object.

3. The method of claim 1, further comprising utilizing the Web Broadcast gateway device to schedule another web object based on the at least one web object, the hierarchy, and the address link pattern.

4. The method of claim 3, further comprising utilizing the Web Broadcast gateway device to form a table of addresses, translation of addresses, links and jumps for each of the at least one web objects in the closed web site to enable scheduling of the other web object.

5. The method of claim 1, further comprising utilizing the Web Broadcast gateway device to form the closed web site based on the size of each of the at least one web objects.

6. The method of claim 1, further comprising utilizing the Web Broadcast gateway device to determine the address linkage pattern by determining links between each web object and the number of jumps from a predetermined one of the at least one web objects in the closed web site to another one of the at least one objects in the closed web site.

7. The method of claim 1, further comprising utilizing a broadcaster to transmit a video content over a channel.

8. A method of viewing at least one web object at a remote mobile device when the at least one web object is transmitted over a broadcast standard channel in accordance with the method according to claim 1, the method of viewing comprising the steps of:

utilizing the remote mobile device to receive and identify the content of a broadcast over the broadcast channel;

utilizing the remote mobile device to determine the type of content received;

utilizing the remote mobile device to process content identified as web objects by establishing a file transfer session;

utilizing the remote mobile device to convert the received content into the at least one web object;

utilizing the remote mobile device to deliver the at least one web object to a user;

utilizing the remote mobile device to process content identified as a video by establishing a video transfer session;

utilizing the remote mobile device to decode the received content into a video stream; and utilizing the remote mobile device to deliver the video stream to the user.

9. An apparatus for transmitting at least one web object over broadcast standard channel to a remote mobile device, the apparatus comprising:

a web server comprising a non-transitory computer readable storage medium for storing at least one web object, wherein the at least one web object has an address;

a hierarchy and an address linkage pattern for the at least one web object;

a closed web site from the at least one web object; and an indicator which is based on the hierarchy and address linkage pattern of the at least one web object for translating the address of the at least one web object in the closed web site.

10. A system of transmitting at least one web object over a broadcast standard channel to a remote mobile device, the system comprising:

means for accessing the at least one web object from a web server, wherein the at least one web object has an address;

means for determining a hierarchy and an address linkage pattern for the at least one web object;

means for identifying a closed web site from the at least one web object;

means for translating the address of the at least one web object in the closed web site to an indicator which is based on the hierarchy and address linkage pattern of the at least one web object;

means for storing the closed web site such that the at least one web object is stored with its associated indicator; and means for transmitting the at least one web object from the stored closed web site at a frequency and a repetition rate which is determined from the indicator.

* * * * *